Dec. 7, 1926.  
A. MELDRUM  
SECTIONAL WHEEL  
Filed July 17, 1925  
1,610,024  
2 Sheets-Sheet 1

Witnesses  
David A Nilsson

Alexander Meldrum, Inventor

Watson, Coit, Morse & Grindle  
Attorney

Dec. 7, 1926.

A. MELDRUM 1,610,024

SECTIONAL WHEEL

Filed July 17, 1925

Patented Dec. 7, 1926.

1,610,024

UNITED STATES PATENT OFFICE.

ALEXANDER MELDRUM, OF SYRACUSE, NEW YORK.

SECTIONAL WHEEL.

Application filed July 17, 1925. Serial No. 44,400.

This invention relates to vehicle wheels and more particularly to sectional cast metal vehicle wheels of the type adapted to receive resilient tires.

It is a general object of the present invention to provide a novel and improved type of sectional cast metal vehicle wheel.

More particularly it is an object of the present invention to provide a two-part sectional cast metal vehicle wheel having the rim formed integral with one of the sections and being provided with non-radial webs joining the rim to the felloe.

A further object of the present invention consists in the provision of the novel method of joining and reinforcing the rim and felloe of a cast metal vehicle wheel.

Still another object of the present invention consists in the provision of a novel and improved means for mounting a side ring of the quick detachable type on the rim of a metal vehicle wheel.

Other and further objects will become more apparent to those skilled in the art by consideration of the following specification and attached drawings wherein are disclosed several exemplary embodiments of the present invention with the understanding, however, that various changes may be made in the size, shape, proportion, arrangement and material of the various parts without departing from the spirit of the invention or the scope of the appended claims.

In said drawings.

Figure 3:
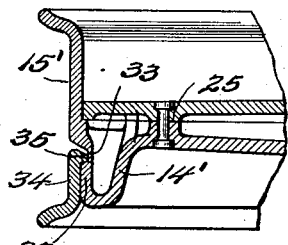
Figure 3 is a partial, enlarged section through the rim of a wheel constructed according to the present invention.

In my application Ser. No. 7,117, filed on the 5th day of February, 1925, there is disclosed a cast metal vehicle wheel formed of two sections abutting substantially along a median plane, one of the sections carrying the rim and the other forming a filling and reinforcing member closing the hollow of the spokes and serving to support the outer edge of the rim on the side remote from the place where it is secured to the felloe of the part carrying it. The present invention contemplates several improvements on that type of wheel which will be readily understood by referring to the accompanying drawings.

The wheel is composed of two sections of which the main one is shown at 10 and the subsidiary one at 11. Each of these sections is a one-piece casting and includes a center or hub portion 12 and hollow spoke portions 13.

The main section of the wheel includes in addition to the hub and spoke portions the felloe portion 14 and the complete rim 15, these parts being integral with the hub and spoke parts. The rim is of the usual construction having a cylindrical base and is provided with the flange 16 to retain a tire in position. Its other edge may be grooved as shown at 17 in Figure 4 to receive the conventional form of side ring 18, as is well-known in the art, the ring and rim being known as the quick-detachable type. The ring is split to allow for its ready removal from the groove 17 for ease in mounting and demounting tires.

Since the rim is completely supported by the main section of the wheel and since the groove 17, which is turned after the wheel is cast, separates it from the edge of the felloe portion 14, other means must be provided for retaining it in position. These comprise suitable webs 19, best shown in Figure 6, extending from the ends of the spoke portions, bridging the hollow of the felloe 14 and thus supporting the rim from the felloe, the webs being cast integral with both of these parts. The inner side of the felloe is open, as are the inner sides of the spokes which are preferably substantially semi-cylindrical in form. It has been found that if the webs are arranged radially, casting-strains result and upon cooling or annealing the webs may draw away from either the felloe or the rim, thus resulting in an insecure structure. To overcome this, the webs have been arranged non-radially so that any shrinking or expanding of either the rim or the felloe or both, while changing the distance between these two parts, will, nevertheless, not crack the webs, but will cause them to rotate slightly about axes parallel to the axle of the wheel and thus adjust themselves without being materially weakened. This is an essential feature of the invention and results in a successful wheel where others have failed. The webs are clearly shown in Figure 6 leading from the edges of the spokes and diverging at an angle of substantially 45° to the center line of the spoke, although the particular angle is immaterial. In addition to supporting the rim from the felloe, these webs form with these two parts what may be termed a box girder materially strengthening the wheel and adding but little to its weight, since they allow the use of thinner material in both felloe and rim.

About one-half of the rim overhangs the spokes of the main section on their hollow sides, and this is partially supported by the subsidiary or filler section 11 previously mentioned. In addition to the hub and spoke parts this section has an outer ring 20 of such a width as to close up the open side 21 of the felloe on the main section to thus present a neat appearance while at the same time supporting the free edge of the rim which is turned to have a cylindrical bore 22 to receive this filler section. The spoke parts on the filler section are complementary to the spoke parts on the main section and together the two sets of spoke parts form complete tubular spokes which may or may not taper in size from the hub toward the rim as may be desired. It will be appreciated that substantial fillets are provided where the spokes join the hub and felloe parts and where the webs join the felloe and rim parts.

Figure 2:
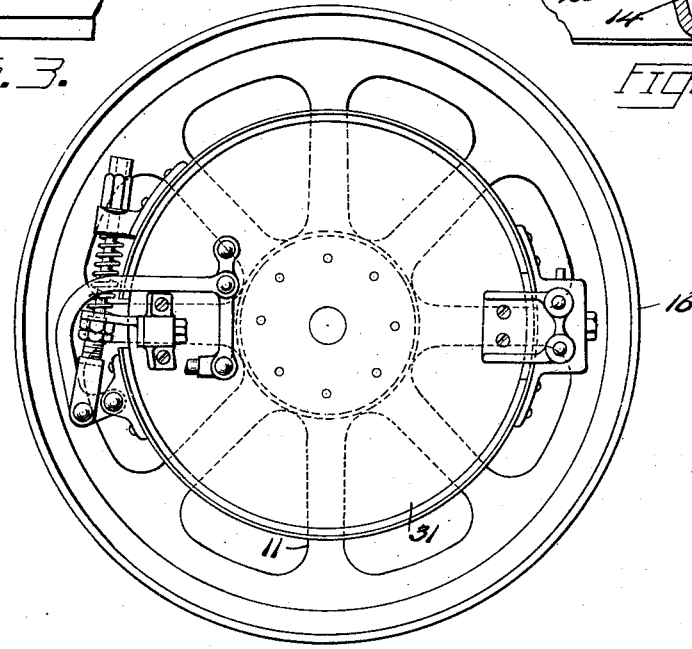
Figure 2 is a side elevation of the wheel of Figure 1 looking from the brake drum side.

The two sections of the wheel are secured together near the outer ends of the spokes just adjacent their junction with the felloe 14 and the ring 20 by means of suitable rivets 23, as shown in Figure 2, which have their heads countersunk and surfaced off to follow the contour of the spokes and thus be invisible after painting. Where the rivets pass through the spokes, suitable bosses 24 project inwardly and meet as at 25 so that the hollow spokes will not be crushed by the riveting operation.

Figure 5:
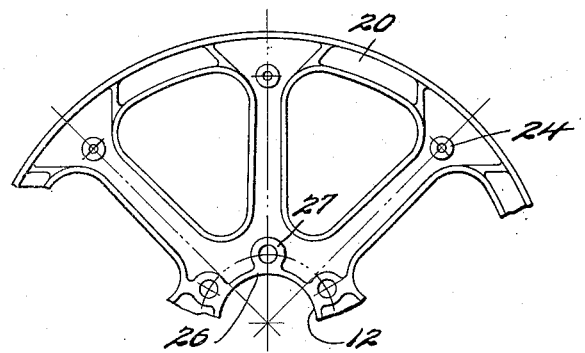
Figure 5 is an inside view of the filler section of the wheel.
Figure 6:
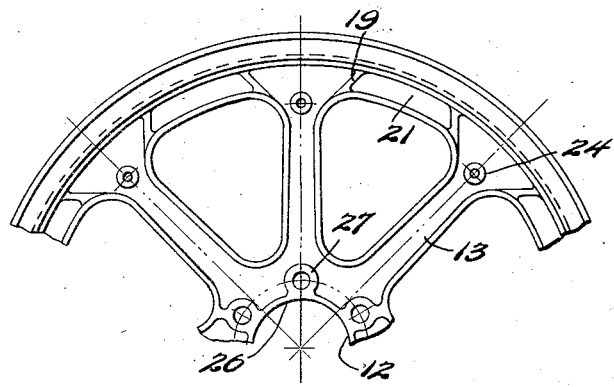
Figure 6 is a similar view of the other or rim carrying section.

The hub portions are hollow, as shown in Figures 5 and 6, and have the inner flanges 26 which abut to close the edges of the central opening in the finished wheel. Bosses 27 are provided on each section and abut as shown at 28 to receive through openings therein, securing means for holding the wheel sections together at the center. These securing means comprise hollow sleeves 28 which are expanded into the countersunk ends of the openings in the bosses 27 to securely hold the center portions of the wheel together.

Figure 1:
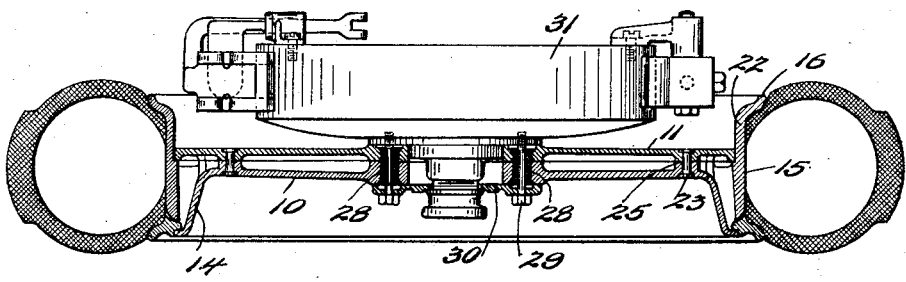
Figure 1 is a horizontal section through a wheel constructed according to the present invention showing the brake drum in elevation.

The sleeves 28 are provided with the central openings, as shown in Figure 1, through which bolts 29 may pass for the purpose of securing the wheel in position on central bearing members or other means for mounting the wheel in position on a live or dead axle (not shown). The bolts may also pass through the outer cover plate 30 and the brake drum 31.

An improved feature of the present invention is the large amount of clearance afforded for the brake drum and brake mechanism by virtue of the fact that the inner side of the wheel has no felloe and thus nearly half of the width of the rim is thus exposed on the inner side to give the absolute maximum of space for the brake drum and brake band and its operating parts. This feature is best shown by reference to Figure 1. With the advent of balloon tires which necessitate small size rims, this feature is found to be of considerable importance, for otherwise the diameter of the brake drum would be unduly limited and the size of the brake anchors and levers would be reduced in such a manner as to materially weaken them.

Figure 4:
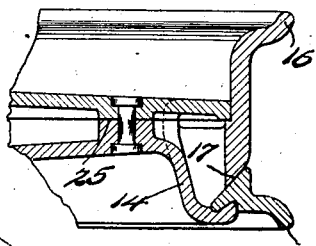
Figure 4 is a similar view showing another method of mounting the side ring.

In Figure 4 is shown the conventional type of side ring for the purposes of retaining the tire in position on the wheel, while in Figure 3 is shown an improved form which it is preferred to use with the present invention. It will be noticed that in this construction, the felloe 14' is narrower and thinner since it need not extend beyond the edge of the locking ring to hold it in place. The rim 15' is provided with the section 32 of reduced diameter having at the junction of the two diameters a groove 33.

The locking ring is somewhat L-shaped in section, the circumferential part 34 being of a thickness to build up the reduced diameter 32 of the rim to the equivalent of the main portion thereof. This part 34 has the inwardly turned flange 35 adapted to fit in the groove 33 to retain the ring in position. With the construction shown in Figure 3, no undercut groove is necessary to retain the side ring in position, for the portion 34 thereof comes beneath the bead of the tire which serves to hold the flange 35 securely in the groove 33 when the tire is inflated. This construction is further of advantage in that the felloe and rim are not separated at the edge, but form a continuous surface from the spokes to the flange of the rim which is not true in the construction shown in Figure 4. This new construction, therefore, provides a lighter and stronger wheel and one which may be more readily constructed while at the same time cheapening the operation of manufacture, since the locking ring is of substantially uniform thickness throughout and can be made by rolling from a plate or bar.

Having thus described the invention what is claimed as new and desired to be secured by Letters Patent is:

1. A cast metal vehicle wheel including in combination, a rim and a hollow felloe, webs connecting said rim to the inner side of said felloe and cast integral with each part, said webs being arranged at an angle to radii of said wheel passing through them.

2. A cast metal vehicle wheel including in combination, a hub, spokes radiating therefrom, a hollow felloe connecting the ends of said spokes and formed by an inner wall and a rim, and non-radial webs supporting said rim from said inner wall substantially as described.

3. In a cast metal vehicle wheel, complementary sections meeting substantially along a median plane, one of said sections having a tire supporting rim formed thereon, a hollow felloe on said section closed peripherally by said rim, one side of said felloe being open, ribs supporting said rim from said felloe and means on said other section to close said felloe.

4. In a cast metal vehicle wheel, complementary sections meeting substantially along a median plane, one of said sections having a tire supporting rim formed thereon, a hollow felloe on said section closed peripherally by said rim, one side of said felloe being open, ribs supporting said rim from said felloe and means on said other section to close said felloe and support said rim beyond said felloe.

5. In a cast metal vehicle wheel, two sections each including integral hub and spoke parts, a rim on one of said sections, a hollow felloe between said rim and spoke parts, and a ring on said other section complementary to said felloe, said rim and felloe being connected by integral webs lying in non-radial planes.

6. In a cast metal vehicle wheel in combination, a rim, a hollow felloe, webs connecting the rim to the inner peripheral wall of the hollow felloe, said webs being cast integral with the rim and felloe.

7. A cast metal vehicle wheel including in combination, a hub, spokes radiating therefrom, a hollow felloe connecting the ends of said spokes and formed by an inner wall and a rim, and webs supporting said rim from said inner wall substantially as described.

8. A rim for vehicle wheels including a main cylindrical portion, a flange at one edge thereof, a second cylindrical portion of lesser diameter, and a flanged ring adapted to removably fit over said second mentioned cylindrical portion and having its surface flush with said first mentioned cylindrical portion and means at the junction of said cylindrical portions to retain said ring in position.

9. A rim for vehicle wheels including a main cylindrical portion, a flange at one edge thereof, a second cylindrical portion adjacent the unflanged edge of said first portion and of lesser diameter, said rim being channelled between said cylindrical portions, a demountable ring adapted to fit over said portion of lesser diameter and to have its surface flush with the larger diameter, an inturned flange on said ring adapted to fit in said channel whereby a tire will hold said ring on said rim.

In testimony whereof I hereunto affix my signature.

ALEXANDER MELDRUM.